2,920,109

ISOMERIZATION OF PARA-DICHLOROBENZENE

Johannes W. Angelkorte, Belleville, N.J., assignor to Union Carbide Corporation, a corporation of New York No Drawing. Application February 1, 1956
Serial No. 562,672

8 Claims. (Cl. 260—650)

This invention relates to a process for the production of meta-dichlorobenzene from para-dichlorobenzene including commercial mixtures of dichlorobenzenes containing a major amount of para-dichlorobenzene. More particularly, this invention is concerned with an improved process wherein para-dichlorobenzene is isomerized largely to the meta isomer by being heated under pressure and at a temperature substantially above its boiling point, and in the presence of a catalyst.

Until recently, meta-dichlorobenzene was avialable only through a complicated series of reactions at relatively high cost. In the direct chlorination of benzene, very little meta-dichlorobenzene is obtained, the dichlorobenzene product being mainly a mixture of ortho- and para-dichlorobenzenes. Although it has been reported that a mixture of dichlorobenzenes obtained by chlorination of monochlorobenzenes in the presence of aluminum chloride contained 18 percent of the meta-isomer (Mouneyrat and Pouret, Compt. rend. 127 1025–27), this result apparently was not confirmed by two later workers. According to Holleman and van der Linden (Rec. trav. chim. de Pays-Bas, 30 (1911) pages 305–380) who repeated the work, the amount of meta-isomer was less than one-third of that reported by Mouneyrat and Pouret. Furthermore, Holleman and van de Linden showed that Mouneyrat and Pouret could not have had as much of the meta-isomer as they reported.

Quite recently, it has been discovered that significant amounts of meta-dichlorobenzene in admixture with ortho-dichlorobenzene and para-dichlorobenzene can be obtained by isomerizing ortho-dichlorobenzene or para-dichlorobenzene in the presence of aluminum chloride and water.

The present invention is based on my discovery that para-dichlorobenzene or mixtures of isomeric dichlorobenzenes in which the para isomer predominates when heated under pressures maintaining the liquid phase to temperatures substantially above its normal boiling point and in the presence of aluminum chloride initially isomerizes to form mixtures containing substantial amounts of meta-dichlorobenzene in admixture with the para and ortho isomers. The yields of the isomerized products by this process are in general over 90 percent.

I have further discovered that surprisingly in such mixtures upon continued reaction under substantially the same reaction conditions, the content of para-dichlorobenzene can be reduced to less than 2 percent of the total mixture. The resultant isomeric mixtures of the meta and the ortho isomers which are practically free from para-dichlorobenzene can be fractionally distilled with comparative ease to yield substantially pure meta-dichlorobenzene since meta-dichlorobenzene has a normal boiling point of 172° C. and ortho-dichlorobenzene has a normal boiling point of 180–183° C. On the other hand, para-dichlorobenzene (normal boiling point 173° C.) cannot be readily separated from its mixtures with meta-dichlorobenzene by fractional distillation except by the use of time consuming and expensive high reflux ratio distillation procedures or by multi-stage solvent extraction.

From the experimental data which I have obtained on my process, it appears that initially, the para-dichlorobenzene is partly isomerized to the meta isomer and partly to the ortho isomer. But with continued reaction, which can be accelerated by use of somewhat higher reaction temperatures (230–250° C.) isomerization of the remaining content of para-dichlorobenzene to meta-dichlorobenzene is favored concomitant with at first an increase in the total ortho-dichlorobenzene content followed later, however, by a reduction thereof as it in turn is isomerized to the meta isomer.

As subsequently shown by the time-temperature data in Example 2, with respect to the treatment of substantially pure para-dichlorobenzene, both the content of the ortho isomer and particularly the meta-isomers in the reaction product definitely increases, as the reaction time is extended or the reaction temperature is raised. On the other hand, that at some point in the reaction process a maximum content or equilibrium amount of ortho isomer is formed probably less than 30 percent, which content is reduced subsequently by isomerization to the meta isomer is indicated by the data in Examples 3 and 4. In said Examples 3 and 4 there is shown the application of my process to a starting mixture consisting of 58 percent by weight of para-dichlorobenzene and 42 percent by weight of ortho-dichlorobenzene. After only a two hour treatment of such a mixture, Example 3 shows that practically all the para-dichlorobenzene had disappeared, and the content of ortho-dchloroben-zene decreased by 12 percent. Example 4 shows that extending the time of treatment of the same starting material to 4 hours while not increasing the final yield of meta isomer, on the other hand is not attended by unfavorable disproportionation or reversion effects such as the reappearance of the para isomer.

The reaction or isomerization can readily be carried out in any vessel or reactor capable of withstanding the pressures developed by the dichlorobenzenes at the reaction temperature employed and constructed of materials substantially chemically inert to the reactants as for example glass-lined metal autoclaves or stainless steel.

A reaction temperature of about 225° C. to 250° C., which is about 50° C. to 75° C. above the normal boiling point of the dichlorobenzenes, is preferred. At this preferred temperature, a material containing about 50 to 60 percent meta-dichlorobenzene can be produced from substantially pure para-dichlorobenzene in a reaction period of about one hour. In general, no commensurate advantage is gained by going to higher temperatures which neverthless can be used if desired.

An amount of anhydrous aluminum chloride ranging from 1 to 10 parts by weight of the dichlorobenzene can be used as catalyst with about 3 to 10 parts being preferred, since under otherwise identical conditions of pressure and temperature, the conversion of the para-dichlorobenzene to the meta-isomer appears to be a linear function of the catalyst concentration. While even larger amounts of aluminum chloride catalyst can be employed, this is attended, however, by somewhat lower yields in that a small percentage of the dichlorobenzenes disproportionate to form mono-chlorobenzene as well as decompose to tarry material.

For instance, heating a mixture (A) of 100 parts by weight of para-dichlorobenzene and 10 parts by weight of anhydrous aluminum chloride under pressure and at a temperature of 225° C. for 2 hours and similarly a mixture (B) containing twice the weight of aluminum chloride yielded reaction products having the following compositions as determined by infra-red spectroscopy:

|  | Percent Composition after Isomerization ||||
|---|---|---|---|---|
|  | Ortho | Meta | Para | Total |
| Mixture A | 8 | 59 | 31 | 98 |
| Mixture B | 17 | 53 | 25 | [1]100 |

[1] Includes 5 percent of monochlorobenzene formed.

The present invention is applicable not only for causing the isomerization of substantially pure para-dichlorobenzenes to a high yield of the meta isomer but also to mixtures of dichlorobenzenes in which the para isomer predominates and which include either ortho dichlorobenzene or meta dichlorobenzene or both. Moreover, the process can be operated directly upon technical grades of para-dichlorobenzene without first subjecting it to a preliminary purifying treatment with aluminum chloride as required by other processes operating at normal temperatures and pressures.

Among other advantages of the present improvement, the use of water in conjunction with the aluminum chloride to effect the isomerization is unnecessary. Thus, the problem of corrosion by hydrochloric acid resulting from hydrolysis of aluminum chloride is eliminated. Also, the aluminum chloride catalyst can be recovered and recycled. Furthermore, the presence of water increases, unnecessarily, the superatmospheric pressure developed in the present process.

The present process is important commercially in that it provides a source of meta-dichlorobenzene which in turn is useful for the production of meta chlorophenol, of resorcinol, and other intermediates; for synthetic resins, explosives, dyestuff intermediates and the like.

The improvement is further illustrated by the following examples.

Example 1

A sealed glass tube containing 10 parts of paradichlorobenzene and one part of aluminum chloride by weight was immersed for a period of two hours in an oil bath maintained at a temperature of 225° C., thereafter discharged at room temperature and recovered. In order to agitate the material during the reaction period, the tube was attached to a rotating disc. At the end of the reaction period, the tube was cooled to room temperature and discharged. A slight pressure was observed. Water was added to the reaction mixture to destroy the aluminum chloride catalyst, the product steam distilled, and the distilled product analyzed by infra-red spectroscopy.

The composition of the material, before isomerization, and of the isomerized product, according to infra-red analysis was as follows:

|  | Composition, percent by weight ||||
|---|---|---|---|---|
|  | ortho | meta | para | total |
| Starting Material (para-dichlorobenzene) | 0 | 0 | 100 | 100 |
| Isomerized Product | 8 | 59 | 31 | 98 |

Example 2

The effect of time and temperature on the extent of rearrangement or isomerization of the para-dichlorobenzene is shown by a number of runs which were carried out under pressure. In each instance the para-dichlorobenzene (100 parts by weight) together with the anhydrous aluminum chloride (10 parts by weight) was sealed within a glass tube and immersed in a heated oil bath for various periods and at various temperatures. The para-dichlorobenzene (before isomerization) had the following composition as determined by infra-red spectroscopy: ortho, 0%; meta, 0%; and para, 100%.

| Run | Reaction || Composition,[1] percent by weight ||||
|---|---|---|---|---|---|---|
|  | Period, hours | Temperature, °C. | ortho | meta | para | total |
| 1 | 1 | 225 | trace | 30 | 70 | 100 |
| 2 | 1 | 250 | 5 | 56 | 37 | 98 |
| 3 | 2 | 225 | 3 | 44 | 47 | 94 |
| 4 | 2 | 250 | 10 | 60 | 30 | 100 |

[1] As determined by infra-red spectoscopy.

Example 3

A sealed glass tube containing one part of aluminum chloride and 10 parts by weight of a commercial mixture of isomeric dichlorobenzenes having the following percent by weight composition as determined by infra-red spectroscopy: 58 percent para-dichlorobenzene, 42 percent ortho-dichlorobenzene and a trace amount of meta-dichlorobenzene was immersed for a period of two hours in an oil bath maintained at a temperature between 225° C. and 240° C. while being agitated as described in Example 1. At the end of the reaction period, the tube was cooled to room temperature and discharged. Water was added to the reaction mixture to destroy the aluminum chloride catalyst, the product being then steam distilled, and the distilled product analyzed by infra-red spectroscopy.

The composition of the distilled product was found to be as follows: 70% meta-dichlorobenzene; 30% ortho-dichlorobenzene; traces of para-dichlorobenzene and a foreign product believed to be monochlorobenzene.

Example 4

Repeating the procedure described in Example 3, but extending the total reaction time to 4 hours yielded a product which after steam distillation had substantially the same percentage composition of ortho-dichlorobenzene and meta-dichlorobenzene as described in Example 3, and from which the meta isomer could be isolated readily by fractional distillation.

This application is a continuation-in-part of my copending application Serial No. 249,812, filed October 4, 1951, and now abandoned.

I claim:

1. A process for increasing the content of metadichlorobenzene in a mixture consisting essentially of isomeric dichlorobenzenes containing a major amount of para-dichlorobenzene which comprises heating said mixture at a pressure sufficient to maintain the dichlorobenzenes in the liquid phase and at a temperature of at least 225° C. in the presence of a catalyst consisting essentially of aluminum chloride, said catalyst being present in an amount of at least one part by weight per 100 parts by weight of said mixture.

2. The process according to claim 1 in which the temperature is in the range of from 225° C. to about 250° C.

3. The process according to claim 1 in which the aluminum chloride catalyst is present in an amount of from one to ten parts by weight per 100 parts by weight of the mixture of dichlorobenzenes.

4. The process according to claim 3 in which the temperature is in the range of from 225° C. to about 250° C.

5. A process for producing meta-dichlorobenzene from a mixture consisting essentially of dichlorobenzenes containing a major amount of para-dichlorobenzene and a minor amount of ortho-dichlorobenzene which comprises heating said mixture in the presence of a catalyst consisting essentially of from one to twenty parts of anhydrous aluminum chloride per 100 parts by weight of said mixture at a temperature of at least 225° C. and under a pressure above atmospheric, maintaining the mixture in the liquid phase.

6. A process for producing meta-dichlorobenzene from para-dichlorobenzene which comprises heating paradichlorobenzene in the presence of a catalyst consisting essentially of from one to twenty parts of aluminum chloride per 100 parts by weight of the para-dichlorobenzene at a temperature of about 225° C. to 250° C. and a pressure above atmospheric until a mixture of dichlorobenzene isomers is formed in which the meta isomer predominates.

7. A process for producing meta-dichlorobenzene which comprises heating para-dichlorobenzene in the presence of a catalyst consisting essentially of from about one to twenty parts of aluminum chloride per 100 parts by weight of the para-dichlorobenzene at a temperature of at least about 225° C. and under pressure maintaining the liquid phase until substantially all the para-dichlorobenzene has been isomerized to meta-dichlorobenzene and ortho-dichlorobenzene, and then separating the meta isomer from the ortho isomer.

8. A process for producing meta-dichlorobenzene from a mixture consisting essentially of dichlorobenzenes containing a major amount of para-dichlorobenzene and a minor amount of ortho-dichlorobenzene which comprises heating said mixture in the presence of a catalyst consisting essentially of from about one to twenty parts by weight of aluminum chloride per 100 parts by weight of said mixture at a temperature of at least about 225° C. and under pressure maintaining the liquid phase until a reaction product is obtained consisting essentially of meta-dichlorobenzene and ortho-dichlorobenzene, and then distilling the reaction product to separate the meta isomer from the ortho isomer.

References Cited in the file of this patent
UNITED STATES PATENTS

| | | |
|---|---|---|
| 2,666,085 | Fitzpatrick | Jan. 12, 1954 |
| 2,727,075 | Mattano | Dec. 13, 1955 |
| 2,819,321 | Pray | Jan. 7, 1958 |